United States Patent [19]

Qu et al.

[11] Patent Number: 5,337,096
[45] Date of Patent: Aug. 9, 1994

[54] METHOD FOR GENERATING THREE-DIMENSIONAL SPATIAL IMAGES

[75] Inventors: Zhimin Qu; Shaugun Pan, both of Coralville, Iowa

[73] Assignee: Pantech, Inc., Coralville, Iowa

[21] Appl. No.: 109,941

[22] Filed: Aug. 23, 1993

[51] Int. Cl.⁵ .................. G03B 21/00; G03B 35/00
[52] U.S. Cl. ........................... 353/7; 353/30; 353/121; 352/57
[58] Field of Search .............. 353/7, 10, 121, 30; 359/470, 462; 352/57, 58, 62, 63, 60, 86; 354/112, 113, 114, 115; 358/3, 88, 89, 90–91

[56] References Cited

U.S. PATENT DOCUMENTS

| | | | |
|---|---|---|---|
| 3,482,913 | 12/1969 | Glenn, Jr. ................................. | 353/7 |
| 3,815,979 | 6/1974 | Collender ................................ | 352/58 |
| 3,908,112 | 9/1975 | Lo et al. ................................. | 235/61 B |
| 3,960,563 | 6/1976 | Lo et al. ................................. | 352/43 |
| 4,738,522 | 4/1988 | Lunde et al. ........................... | 353/30 |
| 5,022,727 | 6/1991 | Smith et al. ............................ | 359/462 |
| 5,024,521 | 6/1991 | Zuchowski et al. ................... | 352/86 |
| 5,255,028 | 10/1993 | Biles ....................................... | 353/30 |

*Primary Examiner*—William A. Cuchlinski, Jr.
*Assistant Examiner*—William C. Dowling
*Attorney, Agent, or Firm*—James C. Nemmers

[57] ABSTRACT

A method for generating a three-dimensional spatial image that has a greatly improved three-dimensional (3-D) effect. The method utilizes a series of two dimensional stereoscopic image pairs which have been composed by different scenes photographed on different bases or computer generated using a single channel or multi-channel optical image projector, beam splitter, camera, and a retro-reflective screen.

6 Claims, 2 Drawing Sheets

METHOD FOR GENERATING THREE-DIMENSIONAL SPATIAL IMAGES

BACKGROUND OF THE INVENTION

Three-dimensional imaging can be classified into two major groups according to the quantity of information required to record the images: (1) binocular stereoscopic imaging, and (2) autostereoscopy or three-dimensional spatial imaging. See Takanori Okoshi, Three-dimensional imaging Techniques, Academic Press Inc. New York pp.4–28 (1976). The binocular viewers, parallax stereogram's, lenticular-sheet binocular stereoscopic pictures, and binocular displays using polaroid glasses or color filters belong in the first group. Parallax panoramagrams, lenticular-sheet three-dimensional imaging, projection type three-dimensional displays, and integral photography etc. belong in the second group.

In the second group, autostereoscopy or 3-D spatial imaging, a three-dimensional image is created by a series of 2-D images of an object captured from different perspectives, and therefore the 3-D image so produced contains multiple-angle information about the object. In all of these 3-D spatial imaging techniques, the most important parameter, called "base", impacts directly on the 3-D effect and the quality of the autostereoscopic display produced. "Base" is defined as the distance between adjacent camera placements from which the pictures of the object are taken. With the base properly adjusted, the overall 3-D spatial quality is produced. If the base is too large, the excessive spatial parallax will cause the image being viewed to degrade the quality of the 3-D effect due to flipping and smearing. If the base is too small, the reduction in parallax will cause the image being displayed to be viewed as somewhat flattened and therefore less 3-D sensational.

Lo et al U.S. Pat. No. 3,960,563 suggests that the maximum spatial parallax between two adjacent images should be controlled so as not to exceed five lenticules in width if the width of the lenticule in the picture is greater than 5 mils, or should not exceed ten lenticules in width if the width of the lenticule is smaller than 5 mils. This technique of trying to control the spatial parallax between an image pair by setting the number of lenticules between an image pair of the same object is not very effective under some circumstances.

U.S. Pat. No. 3,908,112 attempts to solve the problem by a special calculator for use in taking stereoscopic pictures. This calculator is designed to obtain the desired parallax value by determining the location of the camera relative to the foreground element, the background element and the key subject matter element of the scene to be photographed.

However, in spite of these prior art attempts at solving the problems of 3-D spatial imaging, the major difficulty remains in getting both the middle key subject image with perfect 3-D effect while at the same time producing large depth of field for both the background and foreground without causing "flipping".

It is therefore the principal object of the invention to provide a method for overcoming this major difficulty and thereby dramatically improving the 3-D effect of the image. In particular, it is an object of the invention to provide a synthesized depth of field and sensational three-dimensional effect.

SUMMARY OF THE INVENTION

The invention utilizes a single-channel or multi-channel optical image projector, beam splitter, camera, and a retro-reflective screen to compose the foreground objects with a series of stereoscopic image pairs of a projected background to get a new series of stereoscopic image pairs including both foreground objects and background with different photographed bases.

BRIEF DESCRIPTION OF THE DRAWINGS

FIG. 1 is a diagrammatic view illustrating how a series of stereoscopic image pairs can be taken, FIG. 1(a) showing the cameras arranged along a straight line while

DETAILED DESCRIPTION OF THE PREFERRED EMBODIMENT

As previously defined and as used in this specification, the photographed "base" is defined in the multi-channel case as the distance between adjacent cameras from which the pictures are taken and in the single-channel case as the distance the camera is moved between respective photos.

According to the preferred embodiment of the invention, the method for synthesizing a 3-D spatial image comprises three steps.

Figure 1B:
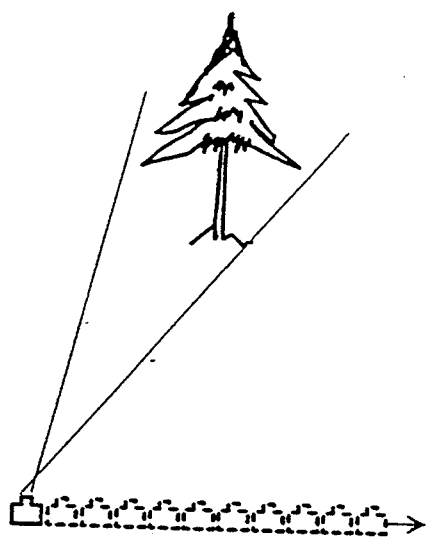
FIG. 1(b) shows the cameras arranged along an arcuate path.
Figure 1A:
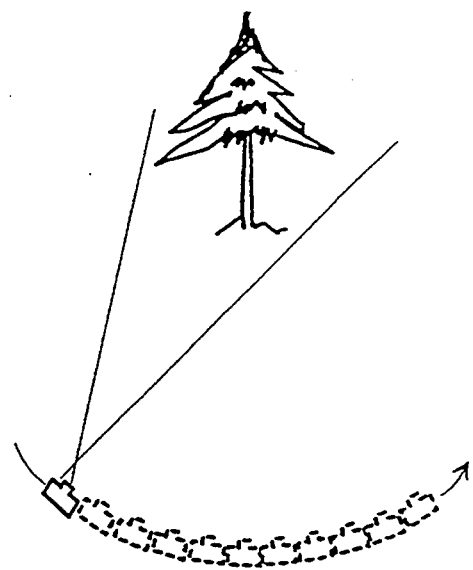

The first step is shown in FIG. 1. Like conventional 3-D photography, a series of two-dimensional stereoscopic image pairs of a scene that will form the background of the final image are taken with cameras from different vantage points around the scene. These pictures of stereoscopic image pairs can be taken sequentially or simultaneously and also can be taken along a straight path as illustrated in FIG. 1(a), or along an arcuate path, as illustrated in FIG. 1(b). These stereoscopic image pairs capture all necessary information about the stereoscopic background scene, if the base is chosen carefully.

Figure 2:
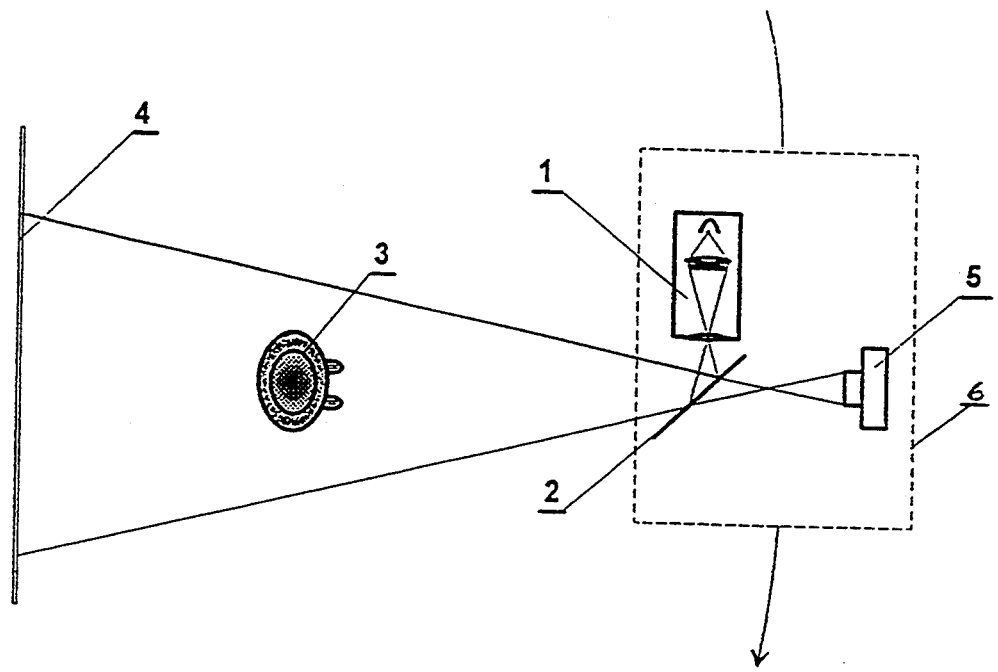
FIG. 2 is a diagrammatic view illustrating the method of synthesizing the foreground objects with a series of projected stereoscopic image pairs of the background, the illustration being of a single one of the projectors of FIG. 3(a)

The second step of the method of the invention is illustrated in FIG. 2 which shows a single channel camera/projector 6. In FIG. 2, an optical image projector 1 is used to project the image pairs of the scene taken in the first step. The image beam from the projector 1 is reflected by a beam splitter 2 and then projected onto the key subject 3 and reflected back by the retro-reflective screen 4, and then goes back along the original path and enters the camera 5. After exposure, the camera 5 along with beam splitter 2 and the projector 1 together are moved to a new position and another picture is taken when a new frame of the background in the projector is accordingly changed. Obviously, each movement can be done either on a straight track or on an arcuate track, depending upon how the movement was carried out in the first step. Of course, a multi-channel camera/projector may be used to carry out step 2 where the pictures are taken simultaneously but with fixed base. Each camera/projector being identical to the single channel camera/projector mentioned above.

Figure 3A:
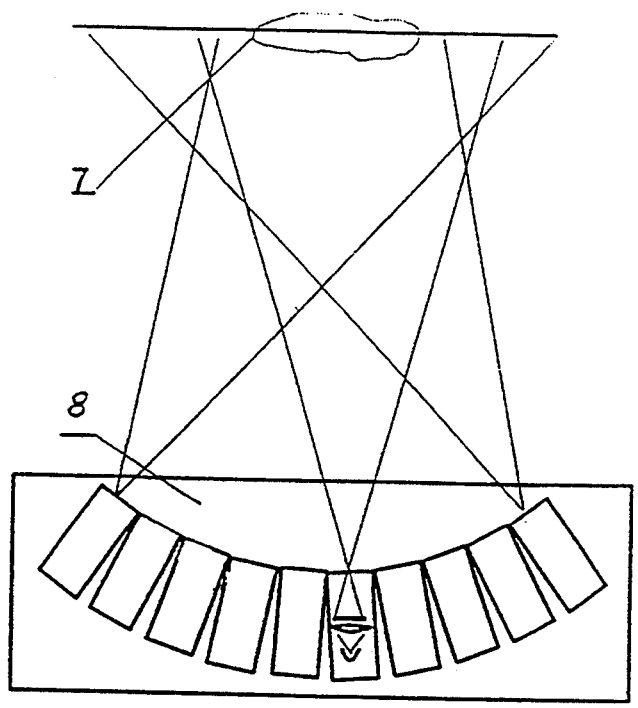
FIG. 3(a) is a diagrammatic view illustrating how the 3-D spatial image is generated using a multi-channel projector.
Figure 3B:
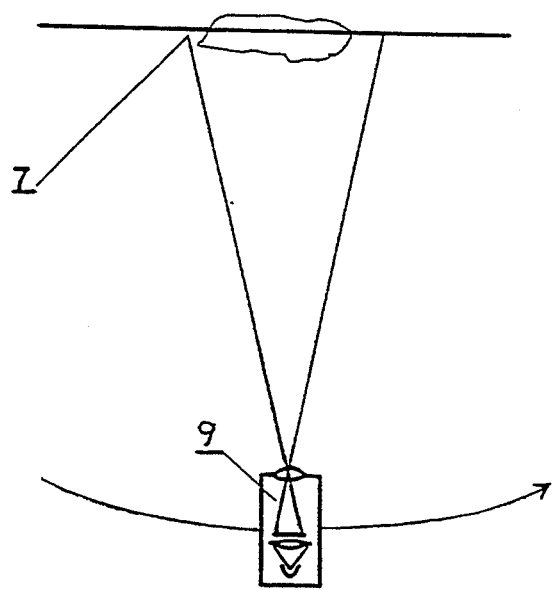
FIG. 3(b) is a diagrammatic view illustrating how the 3-D spatial image is generated using a single channel projector.

The third step of the method of the invention is as shown in FIG. 3. Either a multi-channel projector 8, FIG. 3(a), or a single channel projector 9, FIG. 3(b), can be used for generating a 3-D spatial image. In FIG. 3(a), the pictures photographed in step 2 are placed in the input plane of the multi-channel projector 8, and a 3-D spatial image is projected onto the image plane 7 in which a direction-selective screen or a recording material for either a lenticular type or barrier type display is positioned. In FIG. 3(b), a set of pictures photographed in step 2 are placed in the input plane of the single projector 9 one-by-one and a series of 2-D composite images are projected onto the image plane 7. After exposure, the projector 9 is moved to a new place along a straight line or along an arcuate path, after which the picture in the projector is changed.

According to the method of the invention, the different bases in the first and second step can be chosen for different parallax and a near-perfect 3-D sensation. Also, step 2 of the method can be used as step 1 for another processing, in which case the pictures photographed in step 2 are used as background information. As a matter of fact, the processing is able to be carried out repetitively until all subjects in the 3-D image are of satisfactory 3-D spatial effect. In other words, the most preferred bases can be carried out in both steps, so that a nearperfect 3-D image can be generated which has the image of both the middle key subject with a strong 3-D sensation and both foreground and background without any flipping.

It will be evident to those skilled in the art that the 3-D spatial image display may include barrier parallax panoramagram, lenticular-sheet three-dimensional imaging, projection type three-dimensional displays and integral photography.

Having thus described the invention in connection with a preferred embodiment thereof, it will be evident to those skilled in the art that various revisions and modifications can be made to the preferred embodiment without departing from the spirit and scope of the invention. It is our intention, however, that all such revisions and modifications obvious to those skilled in the art will be included within the scope of the following claims.

What is claimed is as follows:

1. A method for generating a 3-D spatial image display that has a background scene and foreground objects, said method comprising the steps of: generating a series of stereoscopic image pairs of a background scene from different positions around the scene which image pairs will form the background scene of the final image display; and synthesizing the foreground objects with the said series of projected stereoscopic background image pairs to produce a new series of stereoscopic pairs including both foreground objects and the background scene.

2. The method of claim 1 in which the synthesizing step includes projecting each image of the background scene in sequence onto a screen to produce the series of stereoscopic image pairs of a background scene.

3. The method of claim 1 in which the synthesizing step includes projecting the images of the background scene simultaneously onto a screen to produce the stereoscopic image pairs of the background scene.

4. The method of claim 1 in which the synthesizing step includes projecting each image of the background scene through a beam splitter and onto the foreground objects, reflecting the split images back to a camera to create a series of 2-D stereoscopic picture pairs that include both the background scene and foreground objects, and projecting the said picture pairs onto a screen to generate 3-D spatial images for viewing.

5. The method of claim 4 in which a one-channel projector is used for generating the 3-D spatial images, and said projector is moved along a path fixed relative to the screen.

6. The method of claim 4 in which a multi-channel projector is used for generating the 3-D spatial images, and the position of said projector is fixed at a predetermined place relative to the screen.

* * * * *